…

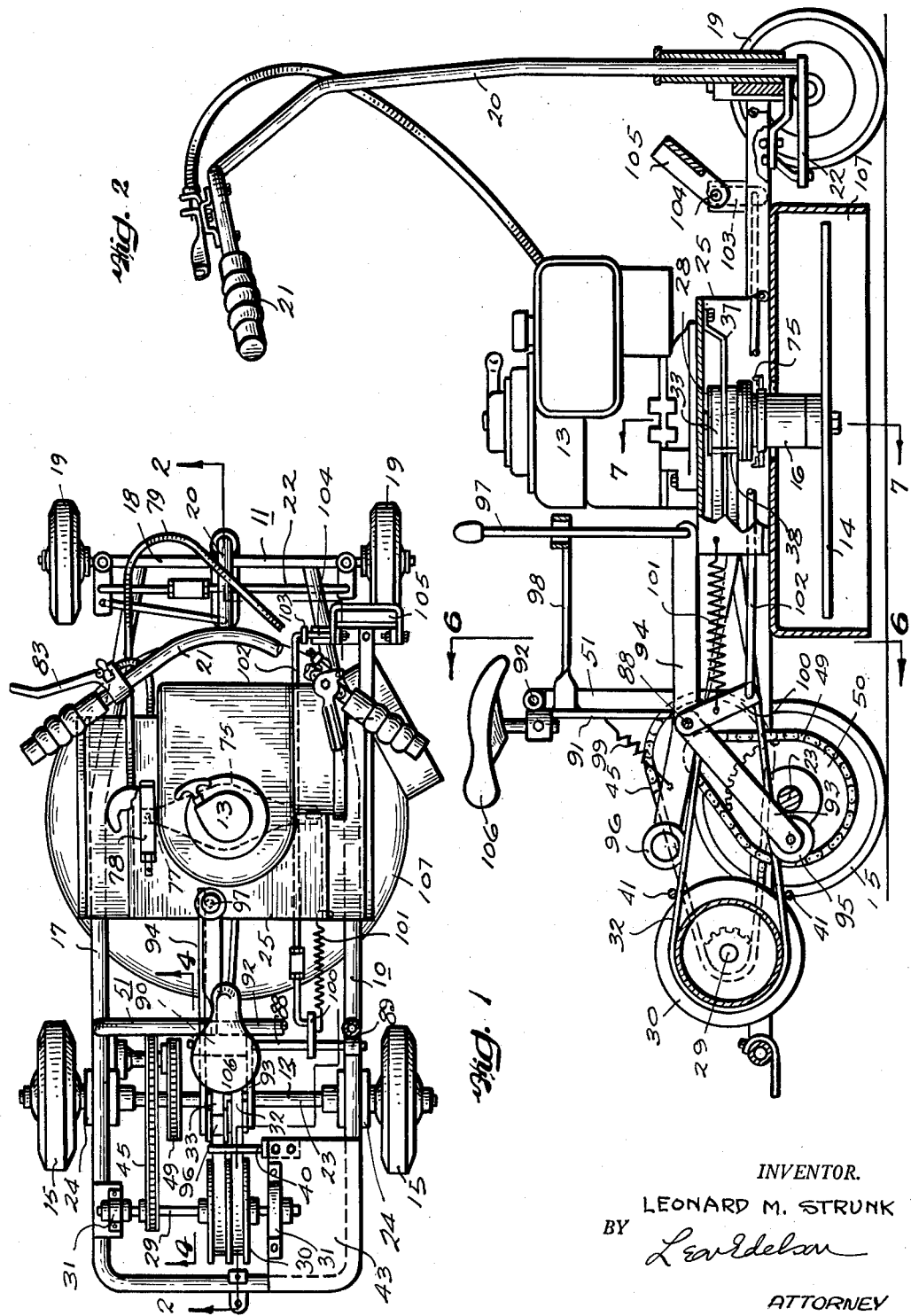

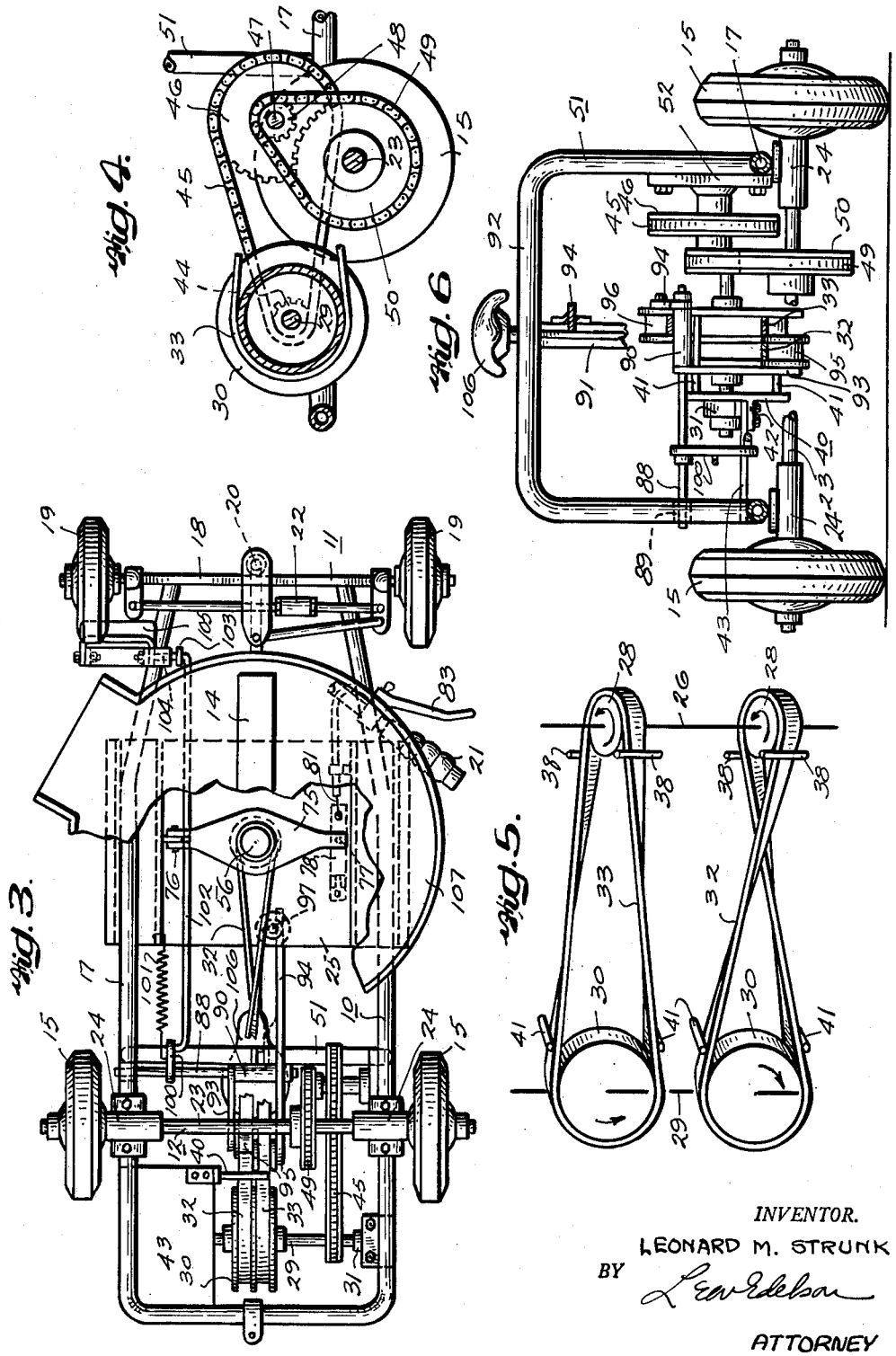

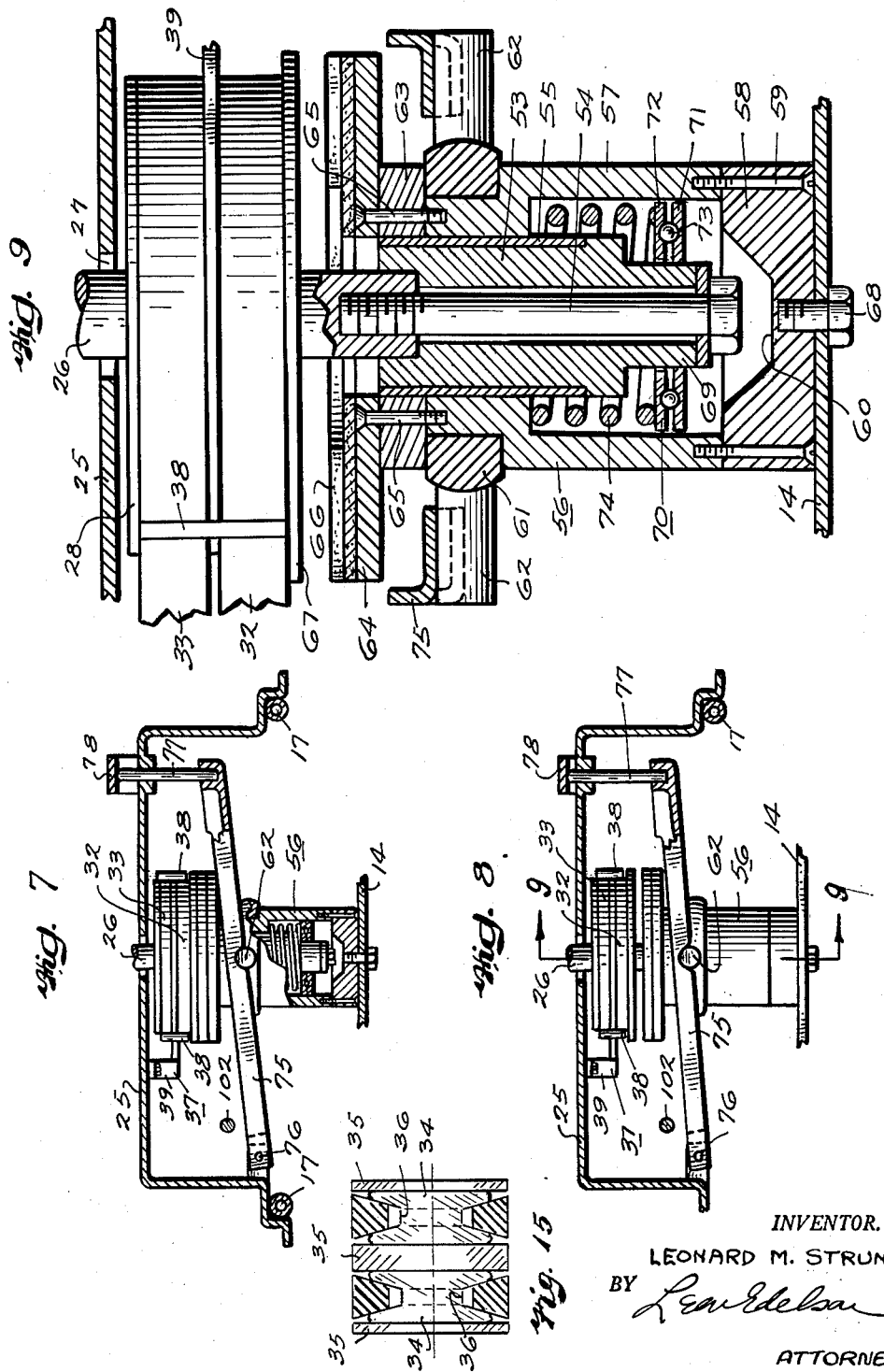

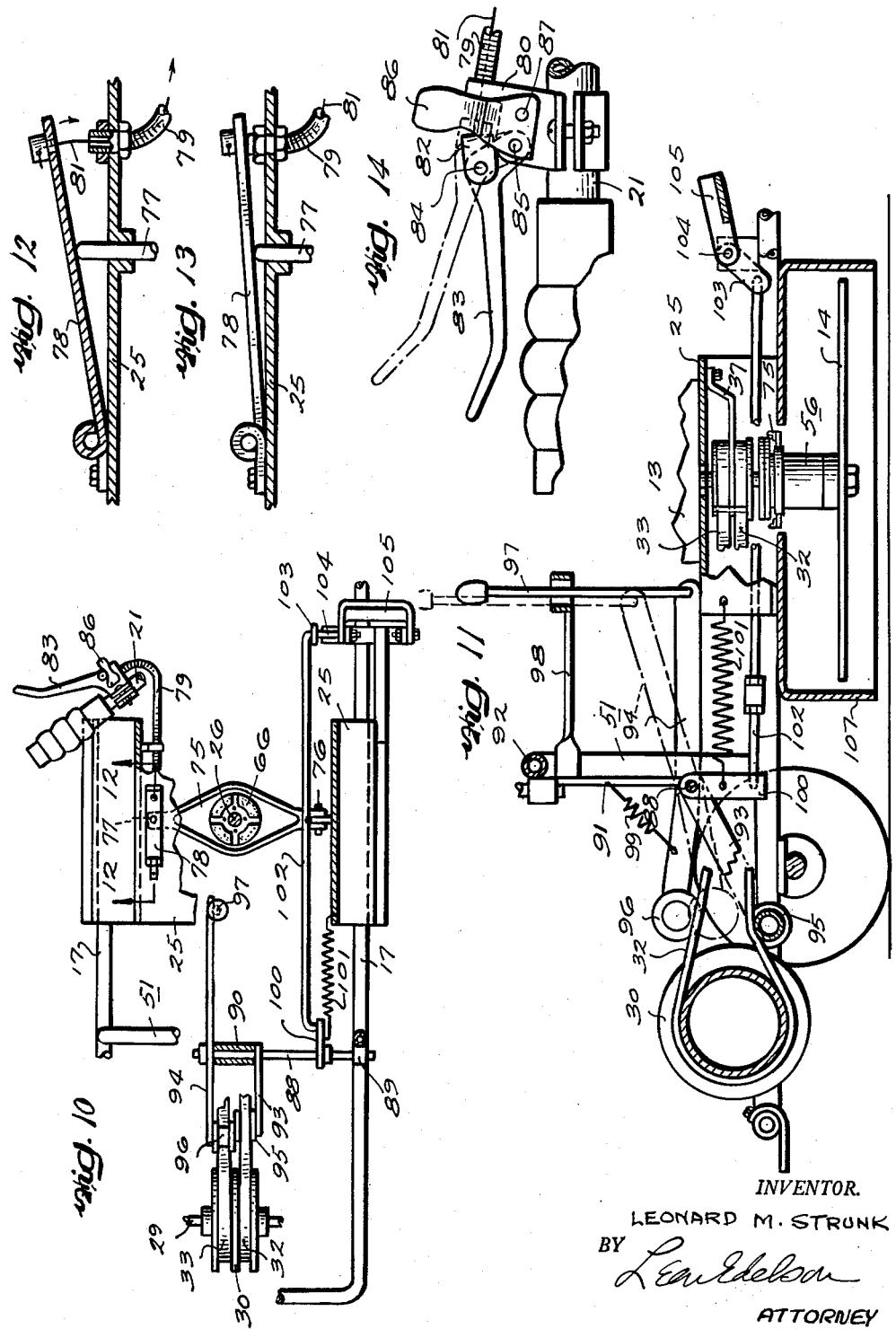

United States Patent Office 3,003,574
Patented Oct. 10, 1961

3,003,574
POWERED IMPLEMENT WITH FORWARD
AND REVERSE DRIVE
Leonard Milton Strunk, R.D. 4, Coatesville, Pa.
Filed Oct. 1, 1956, Ser. No. 613,142
6 Claims. (Cl. 180—70)

This invention relates generally to motor vehicles and more particularly to an improved construction for a power lawn mower of the type having a mobile frame mounting a power unit which propels the mower and operates a horizontally revolving cutter located between the front and rear running gear of the mobile frame.

A principal object of the present invention is to provide exceedingly simple and effective power transmitting means operatively intervening the power unit and traction wheels, which means is conveniently controlled by the driver seated at his station on the mower.

Another principal object of the present invention is to provide such power transmitting means having a pair of endless belt drives and tighteners therefor arranged so that the vehicle is propelled forwardly or in reverse depending upon which belt is tightened, secured against motion in either direction when both belts are tightened and released for coasting in either direction when neither belt is tightened.

And another principal object of the present invention is to provide such power transmitting means with belt and pulley drives wherein the belts and pulleys are of such relative shape and size as to prolong the useful life of the belts.

Still another important object of the present invention is to provide the belt and pulley drives aforesaid with means operating to normally keep the belts trained over their pulleys but each belt operatively disengaged from at least one of the associated pulleys when the belt is not tightened.

And still another principal object of the present invention is to provide exceedingly simple and effective power transmitting means operatively intervening the power unit and traction wheels, and the power unit and horizontally revolving cutter, which means is conveniently controlled by the driver seated at his station on the mower.

A further object of the present invention is to provide such power transmitting means whereby operation of the horizontally revolving cutter may be commenced or terminated at will whether or not the vehicle is in motion.

A still further object of the present invention is to provide such power transmission means with an improved clutch unit operatively intervening the main drive shaft and the horizontally revolving cutter and conveniently operated manually by the driver by remote control.

Other objects and advantages of the present invention will appear more fully hereinafter, it being understood that the invention consists substantially in the combination, construction, location and relative arrangement of parts, all as described in detail hereinafter, as shown in the accompanying drawings and as finally pointed out in the appended claims.

In the accompanying drawings:

FIGURE 1 is a plan view of a power mower constructed in accordance with and embodying the principles of the present invention.

FIGURE 2 is a vertical longitudinal section on line 2—2 of FIGURE 1.

FIGURE 3 is a bottom view of the power mower shown in FIGURES 1 and 2.

FIGURE 4 is an enlarged vertical section on line 4—4 of FIGURE 1.

FIGURE 5 is a diagrammatic representation of the belt and pulley drives operatively intervening the power unit and the traction wheels of the vehicle.

FIGURE 6 is a vertical section on line 6—6 of FIGURE 2.

FIGURE 7 is an enlarged vertical section on line 7—7 of FIGURE 2, showing the clutch engaged for transmitting power to the cutter.

FIGURE 8 is the same as FIGURE 7 but showing the clutch disengaged.

FIGURE 9 is an enlarged section on line 9—9 of FIGURE 8.

FIGURE 10 is a fragmentary plan view showing the manually operated controls for the power transmission means.

FIGURE 11 is a fragmentary vertical longitudinal section showing manually operated controls for the power transmission means.

FIGURE 12 is an enlarged vertical section on line 12—12 of FIGURE 10.

FIGURE 13 is the same as FIGURE 12 but shows the condition of the parts when the clutch is disengaged.

FIGURE 14 is a view showing details of the handle-bar mounted hand lever for remotely controlling the clutch.

FIGURE 15 is a diametric section through a pulley unit and the drive belts trained thereover.

The power mower constructed in accordance with and embodying the principles of the present invention comprises a horizontally extending rigid frame structure, indicated generally by the numeral 10, that is carried upon dirigible front and traction rear running gear assemblies, respectively indicated generally by the numerals 11 and 12. On the frame structure 10, between the front running gear 11 and the rear running gear 12, is a power unit indicated generally by the numeral 13, and underlying the latter, suitably close to the ground, is a horizontally revoluble cutter implement 14. Operatively intervening the power unit 13 and the rear running gear assembly 12 is a belt and pulley drive assembly for transmitting power to the traction wheels, indicated by the numerals 15, and operatively intervening the power unit 13 and the implement 14 is a clutch unit 16 for transmitting power to the implement.

The rigid frame structure 10 includes a tubular member 17 that is generally of U-shape and which has corresponding fore end portions rigidly secured, as by welding, to a rigid bar 18 at the fore end of the vehicle. The opposite end portions of this bar 18 mount the dirigible wheels, indicated by the numerals 19, which wheels are operatively connected to a steering post 20 and handle-bars 21 by conventional linkage, indicated generally by the numeral 22. The traction wheels 15 are mounted upon the opposite end portions of a rear axle 23 that projects through a pair of bearings 24 which depend from corresponding opposite side portions of the tubular frame member 17.

Extending across the vehicle, over the tubular frame member 17, is a rigid plate member 25 of generally inverted U-shape in longitudinal section. The opposite end portions of this plate member are each suitably flanged and seated upon and fixed to the underlying portion of the tubular frame member 17. The power unit 13 is fixedly mounted upon the plate member 25 and is provided with a vertically extending main drive shaft 26 that projects downwardly freely through a central opening 27 which is formed in the plate member 25. This main drive shaft actuates the belt and pulley drive assembly mentioned hereinbefore, which assembly will now be described.

Fitted upon the main drive shaft 26 and keyed thereto for rotation therewith is a double faced belt pulley indicated generally by the numeral 28, and fitted upon a countershaft 29 and keyed thereto for rotation therewith is a second double faced belt pulley indicated generally by the numeral 30. The counter shaft 29 extends horizontally across the vehicle and has its opposite end portions journalled respectively in a pair of bearings 31 that are suitably mounted upon the tubular frame member 17. A pair of drive belts 32 and 33 are loosely trained over the pulleys 28 and 30 in such a manner that with the main drive shaft 26 turning the pulley 28 unidirectionally, the pulley 30 turns the counter shaft in a direction for propelling the vehicle forwardly or in reverse, depending upon which belt is tightened by the driver.

Referring particularly to FIGURE 15, preferredly each double faced pulley is a unitary assembly that includes a set of two grooved members 34 and a set of three flange plates 35 which are alternately arranged. The belts preferredly are V-type conventional belts of a size larger than the size of the grooves provided therefor, in consequence of which a substantial space is provided between the bottom of the groove, designated 36, and a belt portion tight in the groove. The flange plates 35 are of an outside diameter greater than that of the grooved members 34, whereby to increase the effective depth of the grooves, which latter is substantially the same as the distance from the bottom of the groove to the outer side of the belt portion tight in the groove.

The belts are oversize in length as well as in transverse section, in consequence of which they are loosely trained over the pulleys. To keep the belts trained over the pulleys and each belt normally operatively disengaged from at least one of the pulleys, suitable belt keepers are provided. At the pulley 28 is a belt keeper, generally designated 37, including a pair of keeper elements in the form of short rods 38 that extend vertically across the outer sides of the belts, close to the pulley and a short distance to the rear of the main drive shaft 26. These elements are carried by a suitable bracket 39 that is fixed to the bottom of the plate member 25. At the pulley 30 is a second belt keeper, generally designated 40, including a pair of keeper elements in the form of short roses 41 that extend horizontally across the outer sides of the belts, close to the pulley and a short distance in advance of the countershaft 29. These elements are carried by a suitable bracket 42 that is fixed to a rigid plate 43 which is carried by the tubular frame member 17. For transmitting power from the belt and pulley drive assembly just described to the rear running gear 12, a chain and sprocket change speed assembly is provided, which assembly will now be described.

Fitted upon the countershaft 29 and for rotation therewith is a chain sprocket 44 that has a drive chain 45 trained thereover. The latter extends forwardly from the chain sprocket 44 and is trained over a comparatively large diameter chain sprocket 46, which latter is freely revoluble upon a stub shaft 47. Fixed to the chain sprocket 46 for rotation therewith as a unit freely upon the stub shaft 47 is a comparatively small diameter chain sprocket 48 that has a second drive chain 49 trained thereover. This second drive chain extends downwardly from the chain sprocket 48 and is trained over a comparatively large diameter chain sprocket 50, which latter is fitted upon the rear axle 23 for actuating the rear axle and the traction wheels 15 mounted thereon.

Extending upright across the vehicle, a short distance in advance of the rear axle 23, is a tubular member 51 of inverted U-shape that has corresponding lower end portions rigidly secured, as by welding, to corresponding opposite side portions of the tubular frame member 17. An upright rigid plate member 52 is fastened to the tubular frame members 17 and 51, and the stub shaft 47 is fastened by one end portion to the plate member 52, from which member the stub shaft extends inwardly toward the center of the vehicle, parallel to the countershaft 29 and the rear axle 23.

The clutch unit 16 for transmitting power to the cutter implement 14 includes a centrally bored drive shaft extension 53 that is fitted over the lower terminal portion of the main drive shaft 26 and which is removably secured thereto by a bolt 54 projected upwardly through the central bore aforesaid. The drive shaft extension 53 is fitted with a tubular bushing 55, over which bushing is fitted a cylindrical housing that is designated generally by the numeral 56. This housing includes a main body member 57 and a bottom closure member 58. The member 57 has an upper end portion slidably fitted onto the bushing 55, and a lower end portion of enlarged internal diameter. The bottom closure member 58 is removably secured to the lower terminal of the main body member 57, as by bolts 59, and is internally depressed, as at 60, to provide suitable working clearance for operation of the clutch.

The upper end portion of the main body member 57 is of reduced external diameter and is fitted with a trunnion ring 61 that mounts a pair of trunnions 62 which extend outwardly on diametrically opposite sides, in opposite directions. Seated upon the upper end of the main body member 57 is an annular plate member 63 that slidably embraces the bushing 55, and seated upon the plate member 63 is a clutch part in the form of an annular friction disc 64. This disc 64 and the plate member 63 are fixed to the main body member 57, as by bolts 65. It will be understood that the disc 64 is provided with an upper facing 66 that is adapted for frictionally clutching a coacting lower facing 67 which is applied to the pulley 28. Fixed to the bottom closure member 58, as by bolts 68, is the cutter element 14.

A lower terminal portion 69 of the drive shaft extension 53 is of reduced external diameter, and fitted upon the latter is a thrust bearing that is designated generally by the numeral 70. This thrust bearing includes a lower annular plate member 71 that is force fitted upon the reduced diameter portion 69, an upper annular plate member 72 that is fitted loosely over the reduced diameter portion 69, and ball bearings 73 that intervene the plates 71 and 72. Loosely wrapped about the drive shaft extension 53 and seated upon the upper plate 72 of the thrust bearing 70 is an axially compressed spring 74 that operates to bias the main body member 57 and bottom closure member 58, trunnion ring 61 and annular plate member 63, friction disc 64 and cutter implement 14 upwardly in clutching direction as a unitary assembly.

For holding down this unitary assembly against the influence of the compression spring 74, a rigid yoke member 75 is pivotally connected by one end portion to the plate member 25, as at 76, for movement about a horizontal axis. An intermediate portion of the yoke member 75 freely embraces the clutch and is seated upon the trunnions 62. The free end of the yoke member 75 carries a pin 77 that extends upwardly therefrom freely through the plate member 25. The latter mounts a lever 78 that is pivotally connected to the plate member 25 for movement about a horizontal axis, but which is quick releasably depressed by means presently to be described, in consequence of which the pin 77 and the yoke member 75 are held down against the influence of the compression spring 74.

The means for depressing the lever 78 includes a flexible tubular sheath 79 that has a lower end portion fixed to the plate member 25 at a point directly under the free end portion of the lever 78. This flexible sheath extends to the handle-bars 21 and is fixed to a fitting 80 that is clamped to the handle-bars. Attached to the free end portion of the lever 78 is a cable 81 that extends downwardly therefrom into and freely through the flexible sheath 79, emerging from the latter at the fitting 80 mounted upon the handle-bars. The free end portion of the cable 81 is secured to a U-shaped yoke element 82 that is pivotally connected to an operating lever 83, as at 84. The operating lever 83 is in turn pivotally connected to the fitting 80, as at 85. A leaf spring 86 is anchored to the fitting 80 by the pivot 85 and a bolt 87 and is located in the path of the yoke element 82, in consequence of which the cable 81 is quick releasably secured against shifting in the flexible sheath 79 in a direction for releasing the lever 78.

Operatively associated with the belt and pulley drive assembly described hereinbefore is a belt tightener assembly that includes a horizontal shaft 88 which extends across the right hand side of the vehicle, just aft of the tubular frame member 51 and a short distance above the tubular frame member 17. Opposite end portions of this shaft are journalled respectively in bearings designated 89 and 90. The bearing 89 is fixed to an upright leg of the tubular frame member 51, while the bearing 90 is fixed to a bracket 91 that depends from the horizontally extending leg connecting portion, designated 92, of the tubular frame member 51.

The bearing 90 is located directly over the drive belts 32 and 33, and extending rearwardly from the shaft 88, with the drive belts 32 and 33 therebetween, are a lever 93 and the aft end portion of a lever 94 that respectively mount a pair of rollers 95 and 96, which rollers are disposed respectively under the drive belt 32 and over the drive belt 33, as shown. The lever 93 is fixed to the shaft 88 by its fore end portion for movement therewith, while the lever 94 is mounted upon the shaft 88 for turning freely relative to the latter. The fore end portion of the lever 94 extends forwardly from the shaft 88 and mounts a hand pull bar 97 that is secured in upright position by a suitable bracket 98. This lever 94 normally is in the non-working position thereof shown in FIGURE 2, being supported in such position by a relaxed tension spring 99, while the lever 93 normally is in the non-working position thereof shown in FIGURE 2, being secured therein by stop means (not shown).

Depending freely from the shaft 88, intermediate the bearings 89 and 90, is a lever 100 that is biased in a counterclockwise direction (as viewed in FIGURE 2) by a tension spring 101. This lever 100 has connected thereto the aft end portion of a rod 102 that extends horizontally forwardly therefrom for connection of its fore end portion to a lever 103 which depends from a pivot element 104 for a foot pedal 105.

In the operation of the belt and pulley drive, it should be observed that the oversized drive belts have an inherent tendency to cam out of the undersized pulley grooves, and the belt keepers tend to concentrate the slack in the belts in the regions where the belts wrap about the pulleys, in consequence of which the belts normally are operatively disengaged from the pulleys, and even when the power unit is operating no power is transmitted to the traction wheels 15. Therefore, when neither the drive belt 32 nor the drive belt 33 is tightened, the vehicle is free to coast in either direction, whether or not the power unit is in operation.

When it is desired to move forwardly, the driver, seated at his station 106, depresses the foot pedal 105, and in response the lever 103 and the rod 102 are actuated. The lever 100 and the shaft 88, the lever 93 and the roller 95 turn about the axis of the shaft 88 as a unitary assembly, against the influence of the tension spring 101. The roller 95 is thereby brought to bear upon the drive belt 32, in consequence of which the latter is tightened about the pulleys 28 and 30 and power is transmitted to the counter shaft 29 for moving the vehicle forwardly. The slippage between the drive belt 32 and the pulleys 28 and 30 is reduced gradually as the driver increases the pressure applied to the foot pedal 105, and by varying the pressure aforesaid the driver can control the speed of the vehicle.

When it is desired to move in reverse, the driver releases the foot pedal 105 and raises the hand pull bar 97 against the influence of the tension spring 99. In response, the lever 94 turns on the shaft 88, and the roller 96 is brought to bear upon the drive belt 33, in consequence of which the latter is tightened about the pulleys 28 and 30 and power is transmitted to the countershaft 29 for reversing the vehicle.

When it is desired to terminate movement of the vehicle, the driver merely tightens both drive belts, whereupon the countershaft 29, and consequently the traction wheels 15, are locked against movement in any direction.

When it is desired to operate the cutter implement 14, the driver merely pulls the leaf spring 86 out of the path of the yoke element 82, whereupon the operating lever 83 is free to turn upon the pivot 85 and the cable 81 is free to shift in the flexible sheath 79, the lever 78 is free to swing upwardly about its pivot and the pin 77 is free to follow the lever 78. This train of mechanical movements occurs automatically under the influence of the compression spring 74, which acts through the yoke member 75 on the pin 77, immediately in response to removal of the leaf spring 86 from the path of the yoke element 82.

When the yoke member 75 swings upwardly, the unitary assembly comprising the main body member 57 and the bottom closure member 58, the trunnion ring 61 and the annular plate member 63, the friction disc 64 and the cutter implement 14 shift upwardly under the influence of the compression spring 74 until the opposed friction facings 66 and 67 respectively of the disc 64 and the pulley 28 make contact, whereupon power is transmitted to the horizontally revoluble cutter implement 14, which of course is provided with a suitable guard 107. In order to terminate operation of the cutter implement, the driver merely depresses the operating lever 83 against the influence of the compression spring 74, whereupon the train of mechanical movements already described reoccurs in reverse order, the leaf spring 86 snapping back into the path of the yoke element 82 to quick releasably hold the operating lever 83 in position. It will be observed that the cutter element 14 may be operated at any time and the operation thereof may be terminated at any time, whether or not the vehicle is in motion. In addition, in the absence of the bolt 54 that secures the shaft extension 53 in place, the entire clutch and the cutter element 14 can be removed as a unitary assembly, which facilitates the repairing and servicing of the clutch.

It will be understood, of course, that the present invention as hereinbefore described and as shown in the accompanying drawings is susceptible of various changes and modifications which may be made from time to time without departing from the general principles or real spirit of the invention, and accordingly it is intended to claim the same broadly, as well as specifically, as indicated by the appended claims.

What is claimed as new and useful is:

1. In a dirigible ground tending power vehicle, a rigid frame structure, ground engaging wheels respectively supporting the fore and aft ends of said frame structure, a power unit carried by said frame structure and having a depending drive shaft intermediate the front and rear vehicle wheels, and power transmitting means operatively intervening said power unit and the rear vehicle wheels comprising pulley means mounted upon said drive shaft to be unidirectionally driven therewith by said power unit, additional pulley means revoluble about a horizontal axis extending across said vehicle, a pair of endless belts each trained over said unidirectional and additional pulley means but operatively disengaged from the pulley means aforesaid by reason of slack in the belts, one of said endless belts crossing itself between the unidirectionally driven and additional pulley means about which it is trained, belt tightening means mounted upon said frame structure and operable by the driver while seated upon the vehicle for optionally tightening either or both of said belts, whereupon said additional pulley means is rotated in one direction or the other depending upon which of said belts is tightened, and said additional pulley means is locked against rotation when both of said belts are tightened, and means operatively intervening said vehicle rear wheels and additional pulley means and operating to translate rotary motion of the latter in opposite directions respectively into forward and reverse motion of said vehicle, the vehicle being secured against movement in either direction when said additional pulley means is locked as aforesaid, and being free to coast in either direction when said additional pulley means is not locked as aforesaid and either belt is tight.

2. In a dirigible ground tending power vehicle as defined in claim 1 wherein the belt tightening means comprises a pair of belt tightening rollers associated respectively with said belts and normally biased in non-tightening direction, said rollers being manually shiftable in belt tightening direction against said bias either together or independently of one another.

3. In a dirigible ground tending power vehicle as defined in claim 1 wherein the belt tightening means comprises a pair of rigid elongated members mounted for rocking about a horizontal axis independently of one another, a pair of freely revoluble belt tightening rollers mounted on corresponding free end portions of said members for movement therewith, said members and rollers being spring biased in non-tightening direction, and means for manually rocking said members to shift said rollers in belt tightening direction either together or independently of one another.

4. In a dirigible ground tending power vehicle as defined in claim 1 wherein the belt tightening means comprises a horizontal shaft extending across the vehicle and journalled in the frame structure, a rigid elongated member freely mounted upon said horizontal shaft, a second rigid elongated member fixedly secured to said horizontal shaft, a pair of freely revoluble tightening rollers mounted upon corresponding free end portions of said members, one of said rollers being disposed in overlying relation to the associated belt and the other in underlying relation to the associated belt, tension spring means intervening said frame structure and members for biasing said members and the rollers carried thereby in non-tightening direction, and means manually actuated by the driver for rocking said members against the influence of said spring means thereby swinging said rollers in belt tightening direction either together or independently of one another.

5. In a dirigible ground tending power vehicle as defined in claim 1 wherein the frame structure includes a rigid member of inverted U-shape intervening the rear wheels and power unit and extending upright across the vehicle, said U-shaped frame member carrying a driver's seat extending rearwardly therefrom over the rear running gear, the additional pulley means is mounted upon a shaft journalled in the frame structure and located aft of the rear vehicle wheels, the belt tightening means comprises a horizontally extending shaft journalled in said U-shaped frame member and extending across the vehicle above the belts, a rigid elongated member freely mounted upon said horizontally extending shaft and extending rearwardly therefrom, a second rigid elongated member fixedly secured to said horizontally extending shaft and extending rearwardly therefrom, a pair of freely revoluble belt tightening rollers mounted upon corresponding rear end portions of said members, one of said rollers being disposed in overlying relation to the associated belt and the other in underlying relation to the associated belt, tension spring means intervening said frame structure and members for biasing said members and the rollers carried thereby in non-tightening direction, and means manually actuated by the driver for rocking said members against the influence of said spring means and thereby swinging said rollers in belt tightening direction either together or independently of one another, and the means operating to translate rotary motion of said additional pulley means into motion of said vehicle is chain and sprocket change speed means, certain of said sprockets being carried by said U-shaped frame member.

6. In a dirigible ground tending power vehicle as defined in claim 1 wherein the frame structure includes a rigid member of inverted U-shape intervening the rear wheels and power unit and extending upright across the vehicle, said U-shaped frame member carrying a driver's seat extending rearwardly therefrom over the rear running gear, the additional pulley means is mounted upon a shaft journalled in the frame structure and located aft of the rear vehicle wheels, the belt tightening means comprises a horizontally extending shaft journalled in said U-shaped frame member and extending across the vehicle above the belts, a rigid elongated member freely mounted upon said horizontally extending shaft and extending rearwardly therefrom, a second rigid elongated member fixedly secured to said horizontally extending shaft and extending rearwardly therefrom, a pair of freely revoluble belt tightening rollers mounted upon corresponding rear end portions of said members, one of said rollers being disposed in overlying relation to the associated belt and the other in underlying relation to the associated belt, tension spring means intervening said frame structure and members for biasing said members and the rollers carried thereby in non-tightening direction, and means manually actuated by the driver for rocking said members against the influence of said spring means and thereby swinging said rollers in belt tightening direction either together or independently of one another.

References Cited in the file of this patent

UNITED STATES PATENTS

| Number | Name | Date |
|---|---|---|
| 572,051 | Duryea | Nov. 24, 1896 |
| 603,047 | Pickering | Apr. 26, 1898 |
| 869,899 | Gross | Nov. 5, 1907 |
| 958,816 | Merkley | May 24, 1910 |
| 1,271,717 | Kaufmann | July 9, 1918 |
| 1,280,682 | Dickinson | Oct. 8, 1918 |
| 1,713,396 | Rountree | May 14, 1929 |
| 1,758,246 | Brackett et al. | May 13, 1930 |
| 2,192,468 | Gore | Mar. 5, 1940 |
| 2,329,372 | Hitch | Sept. 14, 1943 |
| 2,471,367 | Cavaness | May 24, 1949 |
| 2,509,993 | Soss | May 30, 1950 |
| 2,539,619 | Goodall | Jan. 30, 1951 |
| 2,620,612 | De Eugenio | Dec. 9, 1952 |
| 2,659,445 | Church | Nov. 17, 1953 |
| 2,688,224 | Hainke | Sept. 7, 1954 |
| 2,705,393 | Cofer | Apr. 5, 1955 |
| 2,707,362 | Thelander | May 3, 1955 |
| 2,708,818 | Gentry et al. | May 24, 1955 |
| 2,718,154 | Mathson | Sept. 20, 1955 |
| 2,831,357 | Davies | Apr. 22, 1958 |
| 2,859,461 | Machovec | Nov. 11, 1958 |